United States Patent [19]
Giannetti et al.

[11] Patent Number: 4,884,097
[45] Date of Patent: Nov. 28, 1989

[54] DUPLEX DOCUMENT HANDLER

[75] Inventors: John Giannetti, Penfield; Robert L. Couture, Scottsville; Jerry F. Sleve, Henrietta, all of N.Y.

[73] Assignee: Eastman Kodak Company, Rochester, N.Y.

[21] Appl. No.: 137,776

[22] Filed: Dec. 24, 1987

[51] Int. Cl.⁴ .......................................... G03B 27/32
[52] U.S. Cl. ........................................ 355/23; 355/26; 355/75; 355/48; 271/186; 271/291
[58] Field of Search ................... 355/23, 24, 26, 75, 355/48; 271/186, 291

[56] References Cited

U.S. PATENT DOCUMENTS

| | | | |
|---|---|---|---|
| 4,319,833 | 3/1982 | Hidding | 355/23 |
| 4,441,806 | 4/1984 | Davis | 355/23 |

Primary Examiner—Monroe H. Hayes
Attorney, Agent, or Firm—Leonard W. Treash

[57] ABSTRACT

A duplex document handler includes a supply tray on one side of a stationary exposure position, a simplex exit tray on the opposite side of the exposure position from the supply tray and a duplex exit tray above the supply tray. A turnover drum receives sheets from the supply tray and guides them past an exposure station and to the simplex exit tray or past the exposure station and through an inverting path to a reversing location, back to the exposure station and then back through the reversing location to the duplex exit tray.

9 Claims, 8 Drawing Sheets

FIG. 7
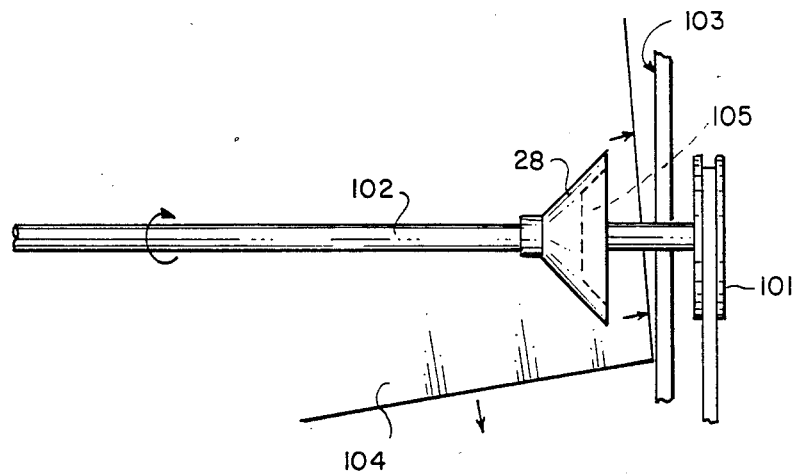
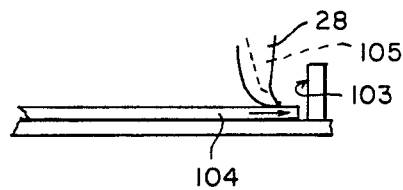
FIG. 8

DUPLEX DOCUMENT HANDLER

RELATED APPLICATIONS

This application is related to co-assigned:

U.S. patent application Ser. No. 137,775, entitled BOTTOM SCUFF SHEET SEPARATING DEVICE, filed Dec. 24, 1987, in the names of John Giannetti, Jerry F. Sleve and Robert H. Shea;

U.S. patent application Ser. No. 137,777, entitled DOCUMENT SHEET SUPPORT MECHANISM, filed Dec. 24, 1987, in the names of John Giannetti, Jerry F. Sleve and Timothy H. Kelley; and U.S. patent application Ser. No. 137,683, entitled IMPROVED SHEET SEPARATING DEVICE, filed Dec. 24, 1987, in the names of John Giannetti and Jerry F. Sleve.

TECHNICAL FIELD

This invention relates to duplex document handlers having particular application in copiers and scanners.

BACKGROUND ART

Document handlers have become important features of modern copiers and scanners. Ideally, they operate at the maximum speed of the copier or scanner, feed the pages of a multipage document past an exposure position in a desired order and leave the document in its original order.

Simplex document handlers have long accomplished this objective by receiving a stack of document sheet in a supply tray face down, separating the sheets from the bottom of the stack and feeding them across an exposure position to an output tray. Succeeding sheets are fed to the top of the previously handled sheets in the output tray, maintaining the original order. If the document sheets are separated from the top of the stack in the supply means, sheet separation is simplified but the document sheets must be turned over to be put in their original order, see for example, U.S. Pat. No. 4,326,797.

Duplex document handlers which consecutively present opposite sides of a document sheet to the same exposure position must turn the document over between presentations, maintain the order and orientation in the output tray and, as much as possible keep up with the exposure capability of the equipment.

U.S. Pat. No. 3,227,444 shows a document handler using a drum to feed a single document sheet past an exposure position. The document sheet is fed off the drum into a turnaround path where its direction is reversed, the trailing edge becoming the leading edge, and the sheet is fed back around the drum to expose the other side. No output tray is shown and the input is one sheet at a time, so the problem of the orientation of the sheets in an output tray is not faced. However, this structure illustrates a problem with this type of document handler. If a stack were placed in the input position with this structure, either simplex or duplex type documents would arrive in the output tray in reversed orientation, depending upon whether the stack was separated off the top or off the bottom.

In a structure shown in *IBM Technical Disclosure Bulletin*, Vol. 14, No. 4, Oct. 1971, this problem is dealt with in a top separating device by feeding the document through the entire turnover mechanism one more time in the duplex mode to re-orient the sheets. This ties up the exposure portion of the machine and thereby materially slows it down.

Additional turnover mechanisms can be added to re-orient the sheets, but this adds substantially to the expense of the equipment.

DISCLOSURE OF THE INVENTION

It is the object of the invention to provide a duplex document handler generally of the type described but which delivers both duplex and simplex document sheets to an output tray in desired orientation without an additional turnaround mechanism or without materially slowing up the equipment for an additional inversion.

These and other objects are accomplished by providing separate output trays for simplex and duplex which are each positioned to receive the appropriate type document sheets in correct orientation. According to a preferred embodiment, the simplex output tray is positioned opposite the exposure position from a common supply tray to provide a straight through simplex paper path. To preserve compactness the duplex output tray is located generally above the supply tray. Preferably, the duplex output tray is hinged to provide access to the supply tray.

According to a preferred embodiment, a turnover drum is located to support the document sheet in the exposure position and rotationally guides the sheet around an inverting path, back to the exposure position for exposure of the reverse side and through the inverting paths to the duplex output tray.

BRIEF DESCRIPTION OF THE DRAWINGS

FIGS. 7 and 8 are top and right vertical views respectively showing detail of a registration roller shown in FIG. 2.

BEST MODE OF CARRYING OUT THE INVENTION

Figure 1:
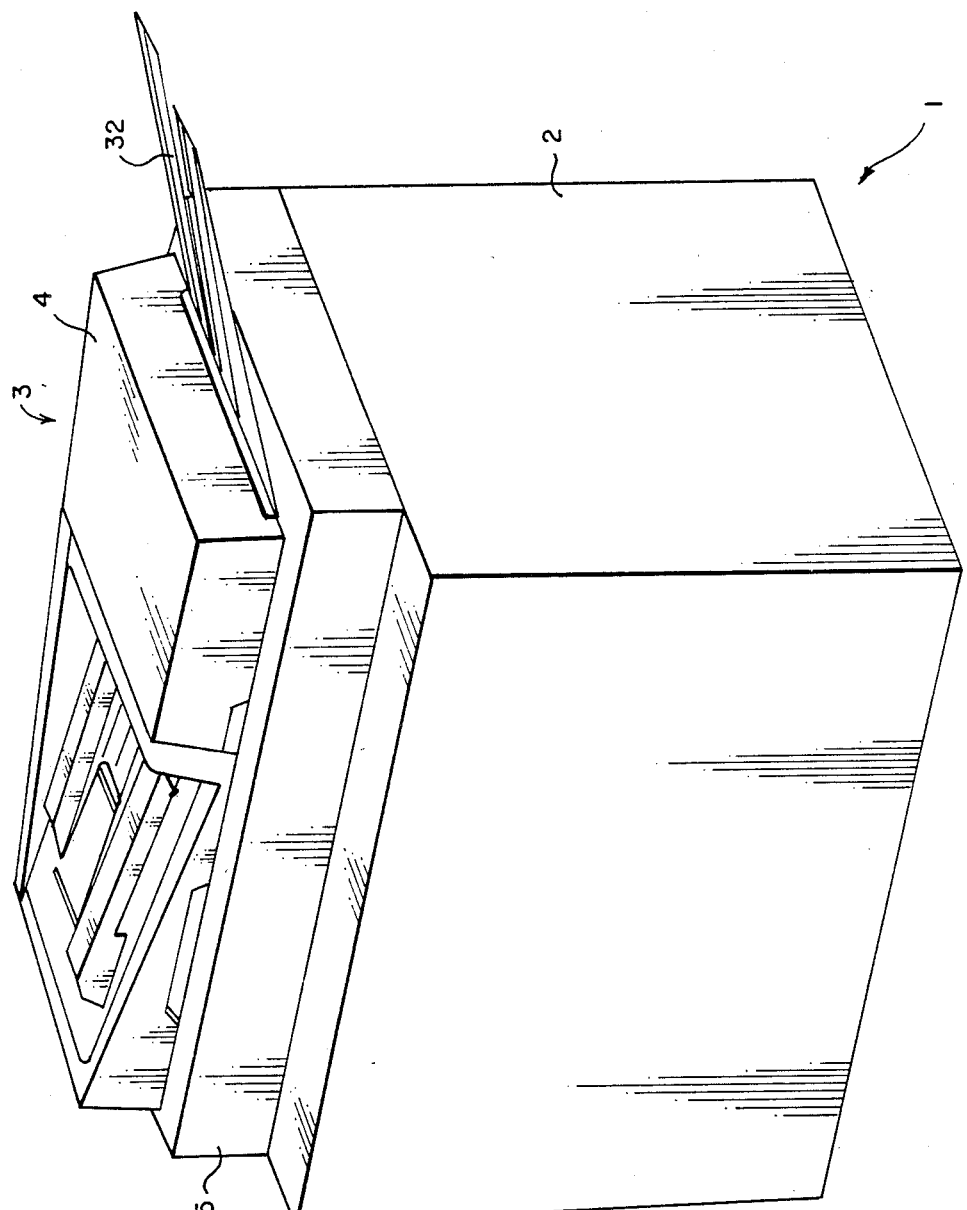
FIG. 1 is a perspective view of a copier which includes a document handling mechanism constructed according to the invention.

According to FIG. 1, a copier 1 is made up of a printer 2 and a scanner 3. The scanner 3 includes a document handler 4 and an optical system enclosed in an optice housing 5.

Figure 2:
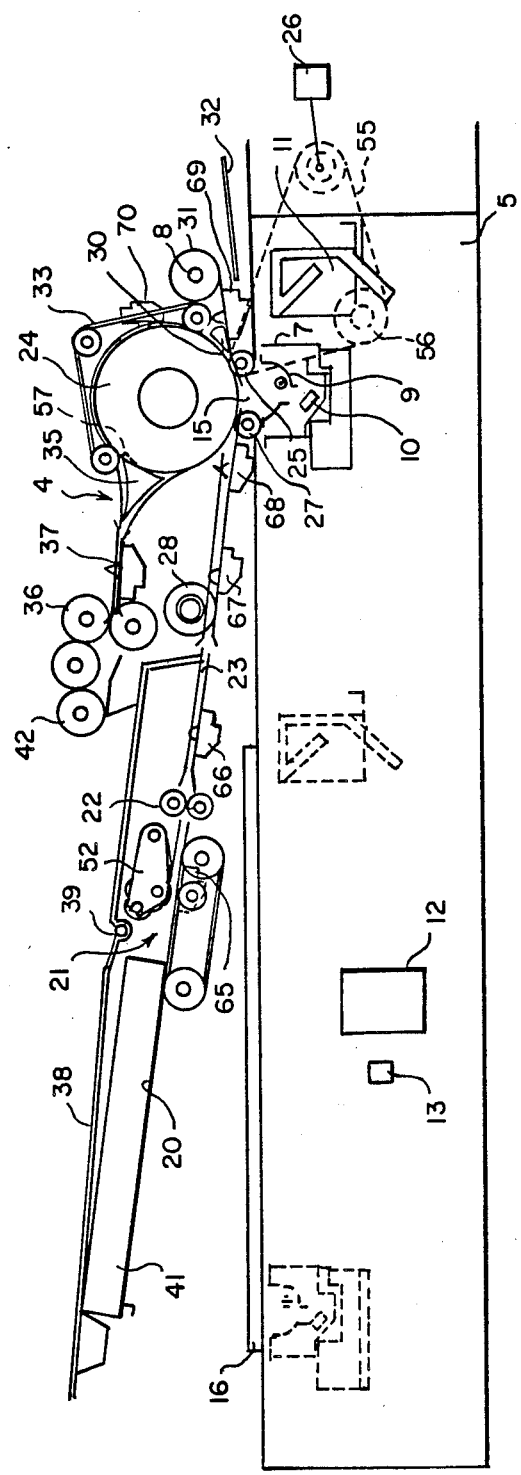
FIG. 2 is a side view of a feeder and scanner constructed according to the invention with support structure and other parts eliminated for clarity.

Referring to FIG. 2, the optical system includes an illumination head 7 containing an exposure radiation source 8, an eliptical reflector 9 and a plane reflector 10. The illumination head 7 cooperates with a pair of movable mirrors 11, an objective 12 and an electrooptical image sensor having separately addressable pixels, for example, a CCD 13. Objective 12 and CCD 13 are stationary while the illumination head and pair of movable mirrors are movable from the position shown in solid lines to the position shown in phantom in FIG. 2.

When the illumination head 7 is located in the position shown in solid lines in FIG. 2, it is positioned to project onto CCD 13 an image of a moving document presented by the document handler 4 to an exposure position 15. The illumination head 7 and mirrors 11 are movable by a pulley system, not shown, to scan an image of a document or other object placed on an exposure platen 16 onto CCD 13.

The document handler 4 includes a document supply or input tray 20 into which a multisheet (or single sheet) document is placed face down. Document sheets are fed one at a time from the bottom of the stack by a scuff separating device 21, to be described more fully below. The input tray 20 is inclined approximately 7 degrees from the horizontal to gain the assistance of gravity in the separating process. Documents separated from the stack are fed by a pair of feed rollers 22 along an input path 23, defined by registration guides and having a registration roller 28, also described more fully below to a turnover drum 24. Turnover drum 24 is driven by drum drive rollers 25 and 27 which in turn are driven through a suitable clutch by a drive belt 55 driven by a motor 26. Drive belt 55 also drives a pulley 56, through a suitable clutch, which in turn drives the pulley system, mentioned above, for moving the optical components during platen mode copying. The document is fed across the exposure position 15 by the combined action of the drum drive rollers 25 and 27 driving both the document and the turnover drum 24. The turnover drum 24 is held tight against the drum drive rollers 25 and 27 to assure location of the document in the object plane of objective 12, also described more fully below.

If only one side of the document is to be scanned, a separator or diverter 30 is moved to a raised position which strips the document from turnover drum 24 and allows it to be fed by a simplex exit roller 31 into a simplex exit tray 32. Because the documents are placed face down in the document input tray 20 and are fed in that position across the exposure position 15 and into the simplex exit tray, and new documents are fed into the simplex exit tray on top of preceding documents, the stack of documents in the simplex exit tray ends up in the same order and orientation as in the document input tray 20.

If both sides of the document are to be scanned, diverter 30 is placed in its down position allowing the document to follow turnover drum 24. The document is held to turnover drum 24 positively by a set of belts 33 which are driven by turnover drum 24. The belts 33 also drive simplex exit roller 31 thereby maintaining constant velocity of the document in the simplex mode. In the duplex mode, the document is separated from the turnover drum 24 by a passive diverter 35 which directs the document into a turnaround path and between reversing rollers 36. The reversing rollers 36 are driven by separate means, for example, a reversible motor, not shown, and drive the document to the left as shown in FIG. 2 until the trailing edge of the document passes a sensor 37. The sensor 37 sends a single to the drive means for reversing rollers 36, reversing the rotation of the rollers and feeding the document back to the right along the turnaround path. Passive diverter 35 now directs the document downward, between rollers 25 and 27 and across the exposure position 15 for exposure of the reverse side. As the reverse side is exposed, diverter 30 stays in the downward position allowing the document to once again continue with turnover drum 24 until directed by passive diverter 35 to feed back along the turnaround path to the reversing rollers 36. This time, reversing rollers 36, assisted by an additional duplex exit roller 42, driven by reversing rollers 36, continue to drive the document along this path until it is completely deposited into a duplex exit tray 38. A stack of duplex documents fed through this path will be stacked in the duplex exit tray 38 in the same order and orientation in which they were placed in the document input tray 20.

Figure 5:
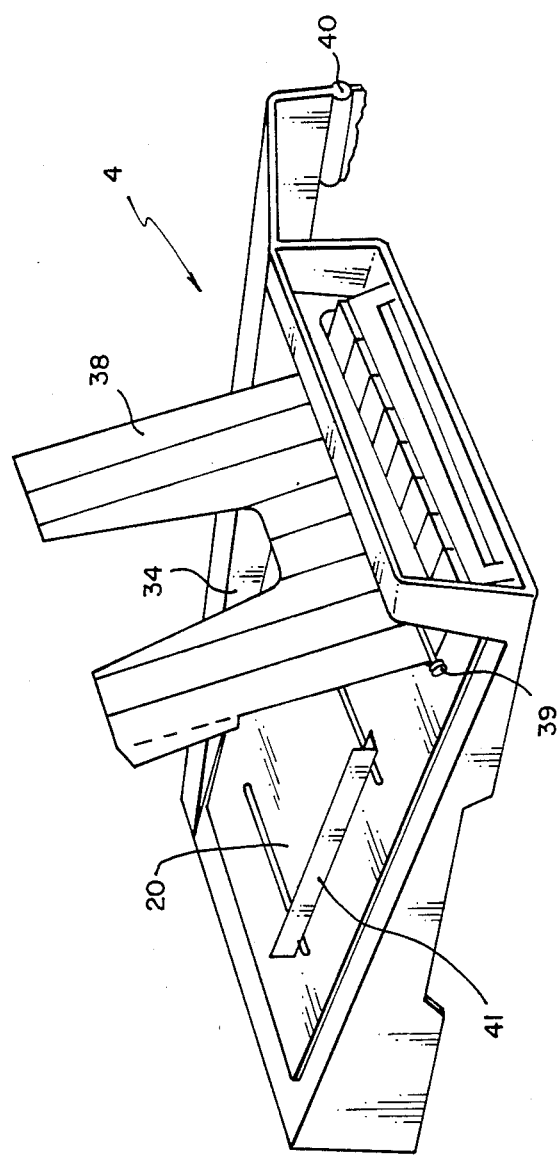
FIGS. 5 and 6 are perspective views of the apparatus shown in FIG. 1 with certain elements in different operating positions.
Figure 6:
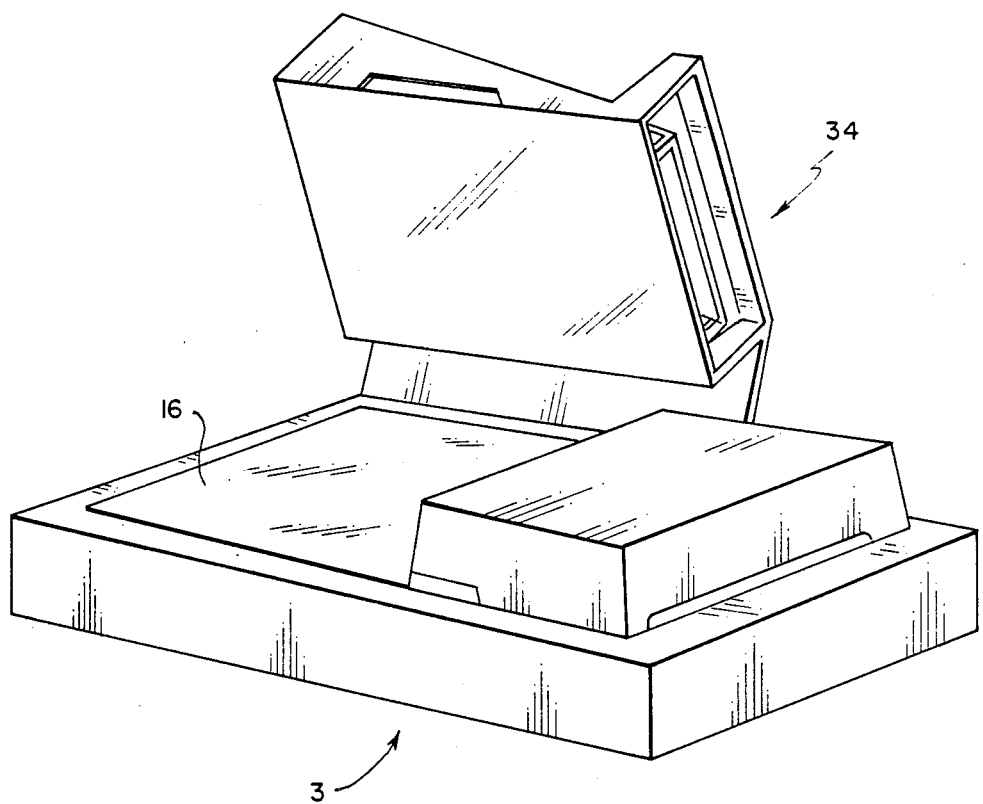

The duplex exit tray has a hinge 39 which allows it to be lifted to a position shown in FIG. 5, permitting access to the document input tray 20. The document input tray 20 is part of a structure which, in turn, is fastened by hinges 40 (FIG. 5) which permits raising of a portion 34 of the document handler left of reversing rollers 36 (FIG. 2) to provide access to the exposure platen 16 as shown in FIG. 6.

Referring to FIG. 5, the document input tray 20 includes an edge guide 41 which is adjustable to assure proper location of the multipage document against a fixed edge guide 34. The adjustable edge guide 41 may also be connectable by means not shown to the logic and control of the apparatus to input the size of the original document being scanned for purposes of automatic choice of magnification, copy sheet size and the like. Alternatively, a set of document sheet size sensors may be incorporated into the input tray for determining paper length and/or width, or one or both of these dimensions may be determined from the signal from CCD 13. These approaches may be combined, for example, by using sensors or edge guide 41 to determine cross-track size and the CCD signal to determine in-track size.

The provision of separate simplex and duplex exit trays 32 and 38 provides an extremely simple, compact and low cost document handling apparatus which returns both simplex and duplex stacks to their respective output trays in their original page sequential order. Factors that contribute to these advantages include the convenient location of the duplex exit tray directly above the document input tray and utilization of the turnaround path for both turnaround of the document sheets in the duplex mode and also exit of duplex documents to the duplex exit tray 38.

Figure 3:
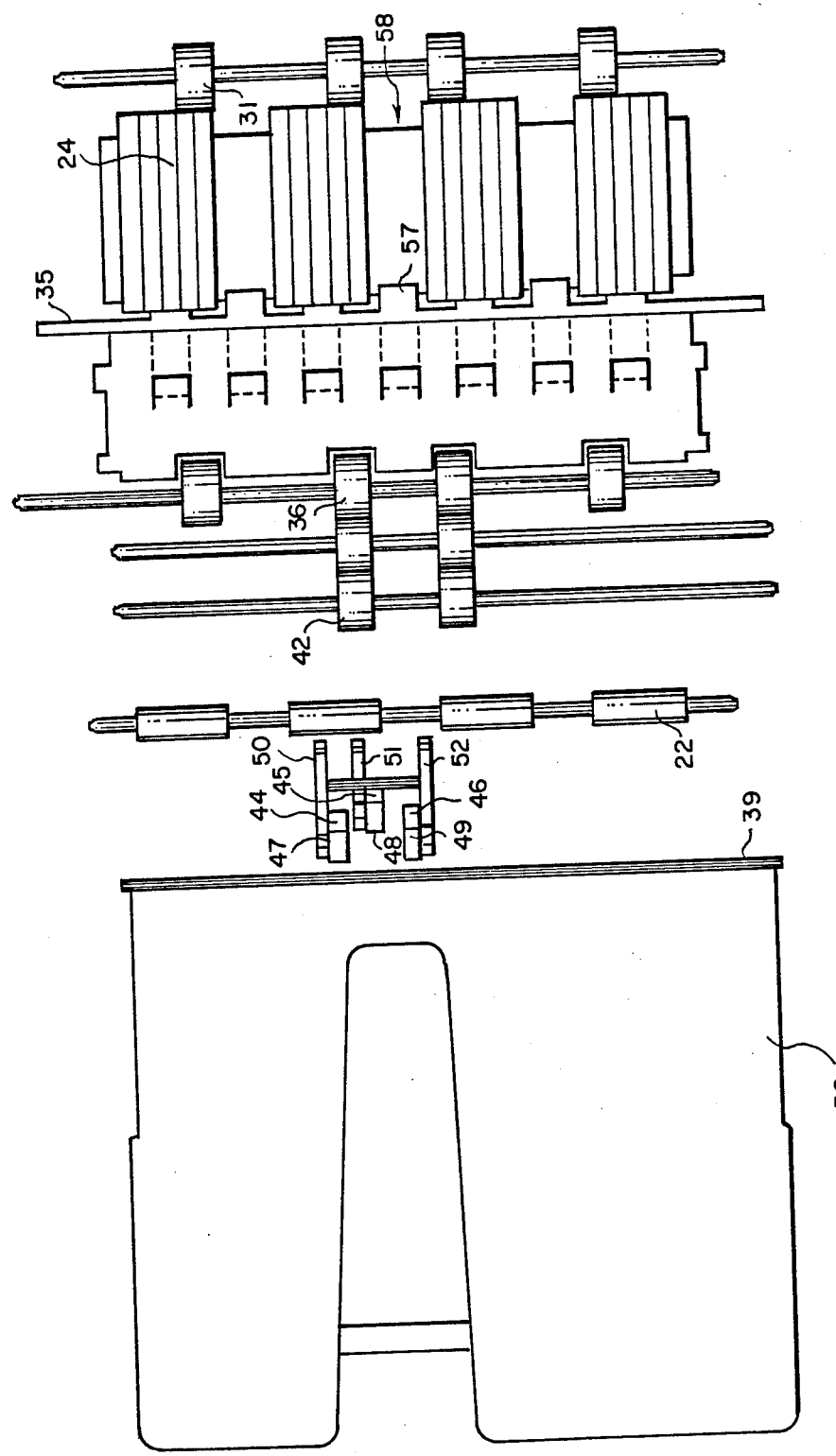
FIG. 3 is a top view of a portion of the apparatus shown in FIG. 2 with parts eliminated for clarity.

The portion of the document being scanned, i.e., that portion of the document in exposure position 15 must be accurately located in the object plane of objective 12. Such location is controlled by the location of rollers 25 and 27. Turnover drum 24 is not radially constrained. More specifically, it has not shaft that is held by bearings. The drum is allowed to "float." It is urged against rollers 25 and 27 by belts 33. With this structure the drum need not be machined or mounted with the accuracy that would be required if it were axially mounted and/or driven. Accurate positioning of the document is dependent upon accurate positioning of rollers 25 and 27 which are smaller and much less costly components to precisely position and manufacture. The drum being allowed to float, it does not convey inaccuracies or lack of symmetry in its support structure to the document. It is thus not inclined to skew the document. Drum 24, as seen in FIG. 3, in fact has no center shaft.

Movement of turnover drum 24 parallel to its axis is prevented by a set of blades 57 formed on passive diverter 35 which extend into recesses 58 in the drum. Thus a single element, passive diverter 35, which can be a low cost molded element performs the functions of diverting in both directions and of rstraining axial movement of drum 24.

Accurate cross-track registration of a document sheet 104 after separation against an edge guide 103 is assured by registration roller 28 shown in detail in FIGS. 7 and 8. Registration roller 28 is a soft, preferably foam rubber roller which is tapered or conically shaped. It is mounted on a shaft 102 and driven by a pulley system 101 connected to drum drive rollers 25 and 27. Shaft 102 is mounted orthogonal to the in-track direction so that the pointed edge of roller 28 drives the sheet 104 directly in the in-track direction. However, the roller has an undercut 105 which permits compression of the roller by the sheet as shown in FIG. 8. This compression has a component in the cross-track direction moving the sheet toward the edge guide 103. Thus, an inexpensive soft tapered roller mounted and driven on a shaft parallel to the other shafts in the system assures important cross-track registration of the document sheets.

The scuff separating device 21 contributes substantially to the reliability of the document handler 4 of the scanner 3 while still being simple in construction and low in cost. Because it is a document separation device rather than an ordinary copy sheet separation device, it must work with whatever type of document sheet the user places in it. It may have to separate and feed document sheets that vary substantially in age, weight and condition.

Figure 4:
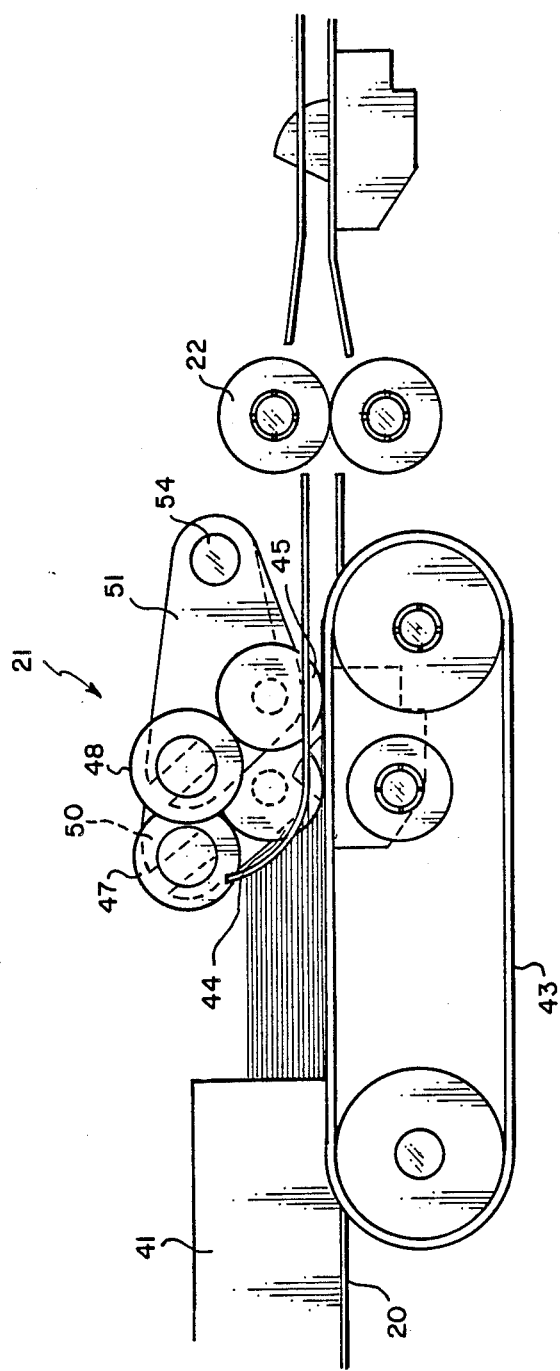
FIG. 4 is a side view of a portion of the apparatus shown in FIG. 2 with parts eliminated for clarity.

According to FIGS. 2, 3 and 4, the separating device 21 includes a scuff feed belt 43 positioned with its top surface slightly raised from the surface of document supply tray 20. Retard separating rollers 44, 45 and 46 are positioned opposite scuff feed belt 43 and are driven only by contact with belt 43 either directly or through document sheets to be fed. The retard rollers are engaged by brake rollers 47, 48 and 49, respectively, and are held by roller arms 50, 51 and 52, respectively, which pivot about a rod 54. In the preferred embodiment of the device, retard rollers are held against the belt 43 by their own weight and that of the braking rollers and the roller arms. Additional force from springs could be used, but in most applications unnecessarily complicates the device. The brake rollers are made of a softer material than the retard rollers. Roller arm 52, retard roller 46 and brake roller 49 have been eliminated from FIG. 4 for clarity of illustration. Brake rollers 47, 48 and 49 are urged against retard rollers 44, 45 and 46 by conventional adjustable spring and screw mechanisms which establish a fixed center distance between the brake and retard rollers and which produces a compression of the softer brake roller resulting in the desired braking force on the retard roller.

In operation, a stack of document sheets is placed face down in supply tray 20 and feed belt 43 is driven in a clockwise direction. The coefficient of friction of the feed belt 43 is sufficiently high that it has a tendency to feed at least the bottom sheet of the stack toward drive rollers 22. The coefficient of friction of the retard rollers 44, 45 and 46 is also high, i.e., it is higher than the coefficient of friction between any two sheets intended to be fed. The braking force applied by brake rollers 47, 48 and 49 is chosen such that retard rollers 44, 45 and 46 will be rotated by the belt when a single sheet of paper is between the retard rollers and the feed belt, permitting feeding of that single sheet of paper into feed rollers 22. If a second sheet of paper comes between any of the retard rollers 44, 45 or 46 and the bottom sheet of paper in the stack, the braking force on the retard roller in question is high enough to prevent rotation of the roller until the lower frictional force between the sheets is overcome. In this instance, the retard roller will not rotate and the second sheet will remain stationary underneath the retard roller while the bottom sheet is separated and fed by belt 43. It no sheets are between the belt and the retard rollers then, the high coefficients of friction of the belt and retard rollers will cause the feed belt 43 to overcome the braking force applied by brake rollers 47, 48, and 49 and directly rotate the retard rollers. Thus as each sheet is fed, a very small incremental rotation of the retard rollrs will occur presenting a clean surface to assist in retarding. This incremental rotation is proportional to the lead edge distance between sheets as they are fanned around the retard roller at the start of a job.

This system has a number of advantages. Unlike prior retard systems, at no time is there intended to be any slippage between the scuff belt 43, the retard rollers 44, 45 and 46 and the documents. Only slippage between document sheets is permitted. Thus, this system will successfully feed documents that prior systems would tear or smear. In addition, because of the high coefficients of friction on the drive and retard elements, contact pressure between the belt, rollers and sheets can be greatly reduced over conventional scuff systems, also reducing document damage. The amount of frictional retard force exerted by retard rollers 44, 45 and 46 can be adjusted by adjusting the braking force applied by the brake rollers 47, 48 and 49. The system has an extremely wide latitude of frictional forces that can be applied and still feed and separate an extremely wide latitude of types of documents. The frictional force applied by the retard rollers and also by the belt only has to be greater than the frictional force between the sheets while the braking force need only be small enough to permit turning of the roller when a single sheet or no sheet is present and large enough to prevent turning when two sheets are present. Because friction between sheets is generally quite light, this tolerance is extremely wide and allows a great latitude in materials used, rarely gets out of adjustment and permits feeding of a wide variety of types of documents. For example, the coefficient of friction for most papers is in the 0.8 to 1.0 range. In theory, the coefficient of friction on the retard rollers can be anything in excess of that. In fact, the weight of the stack adds to the frictional force between the document sheets, so that, coefficients of friction in excess of 2.0 are preferred for both the retard rollers and the scuff belt 43. No special relationship is required between the coefficients of friction of the belt and the retard rollers, as would be required in conventional scuff systems relying on slippage between a retard means and one side of a single sheet being fed.

Reliability of the system is improved by positioning retard roller 45 at a different in-track position from retard rollers 44 and 46. The distance between pivot rod 54 and the center of retard roller 45 is different from the distance to rollers 44 and 46. In addition to changing the in-track position of roller 45, this construction provides slightly different working angles between the roller arms and the different of travel of a sheet being fed by scuff separating device 21. If two sheets are in fact fed between the belt 43 and rollers 44 and 46 those two sheets will be picked up separately by retard roller 45 and the top sheet retained while the bottom sheet continues on its path. This can happen if three sheets of paper somehow get between retard rollers 44 and 46 and the belt 43, with only the top sheet being retained by the retard rollers at that position. For example, if a stack is placed in the input tray 20 with the leading edge of one sheet well behind its adjacent sheets, both bottom sheets may be fed together, with the middle sheet eventually stopped by the downstream retard roller 45. Because of the slightly greater angle of attack between the roller arm 51 compared to roller arms 50 and 52 retard roller 45 will exert slightly more force to retard the second sheet, assuming the force applied by the braking rollers is the same. This factor also has a tendency to reduce the number of double feeds.

The angle between the roller arms 50, 51 and 52 and the sheets that are fed by feed belt 43 is quite small, for example, in the range of 15 to 40 degrees. This permits the separation and feeding of different thicknesses of paper. The location of the pivot rod 54 downstream from the retard rollers, has a tendency to increase the force retarding the top sheet when the roller is not rolling, i.e., when there are two sheets in the nip, but desirably relaxes the force somewhat when the roller is rotating, i.e., when there is only one or no sheets in the nip.

It is recognized in the art that belt feed mechanisms contact a greater area of a sheet than do roller feed devices and are therefore preferred for many applications. A larger proportion of the stack weight is supported by the belt compared to the input tray which increases the force moving the bottom sheet and decreases the drag from the tray. A roller would need a much higher coefficient of friction to have the same effect. Since paper is never completely flat, the greater area reduces the probability that contact will be lost. Belts also have some tendency to be more efficient because all motion of the top of the belt is in the direction of feeding while a roller drives fully in that direction only where tangential velocity is in the feed direction.

Despite these advantages and perhaps because of lower cost, rollers are more commonly used than belts for scuff separating devices. U.S. Pat. Nos. 2,665,906 and 4,480,827, cited above, suggest top separating devices with braked retard rollers and feed rollers. However, the scuff belt described herein has features not taken advantage of in the prior art roller or belt devices. As the belt 43 advances it tries to both rotate the retard rollers and to pivot the arms 50, 51 and 52 about rod 54. The arms deflect the belt downwards until the desired brake force is overcome allowing the rollers to turn or until friction between the sheets is overcome allowing the bottom sheet to slide on the sheet next to it. This deflection of the belt generates a high localized normal force between the sheet to be separated and the belt, which forces are not applied to the test of the stack.

Another aspect of the use of the scuff belt unique to this structure is that it permits the use of the multiple retard system embodied in roller 45, and explained above, which greatly enhances the prevention of double feeding when trying to separate sheets from dishevelled stacks.

The ability of each retard roller to both pivot about rod 54 and to rotate is a significant aspect of the preferred embodiment of this separating device. It permits the separation device to separate sheets of varying thicknesses, an important feature of a document feeder and a limiting characteristic of prior scuff feeders. In operation, as a sheet is fed it will slightly rotate the retard roller until the roller rolls and pivots up on the leading edge of the next (second) sheet, at which point the first sheet is advanced by the belt with the second sheet restrained by the roller. The roller stops its roll and upward pivot immediately after it lifts off the bottom sheet regardless of the thickness of the sheet. If the belt is depressed by the force of the retard roller the retard roller moves with the belt to maintain the best distance for the respective thicknesses of the sheets preventing a greater opening that might result in a double feed.

The document handling portion 4 contains a number of sensing devices 65, 66, 67, 68, 69 and 70 in addition to previously mentioned sensing device 37. These devices are generally placed at strategic points to detect either the front edge, the rear edge of a document or the lack of either at the right time, to actuate the various components downstream from those sensing devices or signal that a jam has occurred.

The entire scanner 3 is driven by three motors. Motor 26, described above, drives drive belt 55 which drives drive roller 25 through a suitable clutch and hence duplex drum 24 and associated rollers and belts. Roller 27 is connected to roller 25 to also be positively driven by motor 26. As mentioned above, motor 26 and its drive belt 55 also drive pulley 56 through a suitable clutch and pulley system, not shown, for moving illumination head 7 and the pair of movable mirrors 11, as is well known in the art. Turnaround rollers 36 and rollers abutting them are driven by a separate reversible drive motor, not shown, and scuff feed belt 43 is driven by its own drive motor, also not shown.

Drive rollers 22 are driven by the same motor driving the scuff feed belt 43. However, through a suitable clutch, not shown, scuff feed belt 43 is stopped after a document has reached rollers 22. It is started agains when sensor 65 senses the trailing edge of the document. Sensor 65 is positioned to provide a suitable interframe, for example, 2.5 cm between the documents.

Figure 9:
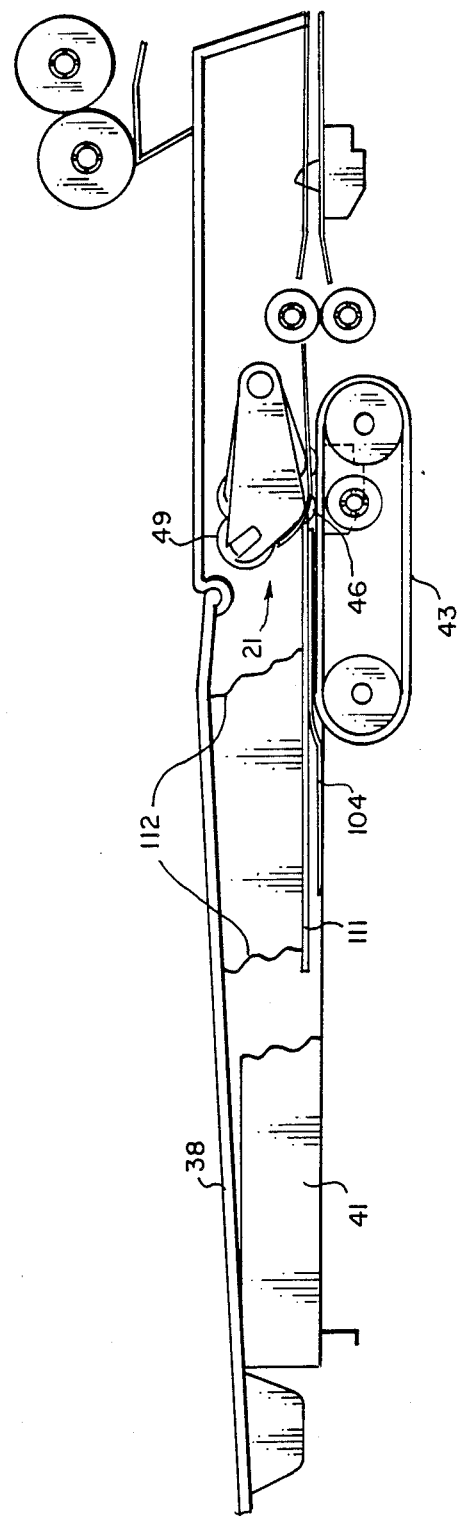
FIG. 9 is a side view similar to FIGS. 2 and 4 of an alternative form of a separation device shown in FIG. 4.

An alternative embodiment of the separation device 21 is shown in FIG. 9. According to this embodiment, the range of the separation device can be further extended by provision of a movable insert 111 which is held by light springs 112 to duplex output tray 38. Insert 111 rests on the top sheet 104 of the stack of sheets. When only the last sheet is to be fed, movement of that sheet by scuff belt 43 causes insert 111 to move lightly into contact with retard rollers 46 and 48 exerting a lifting force on them and reducing the force required to move the last sheet through the system. In this embodiment, retard rollers 46 and 48 may lift to the point that they stop rotating, thereby permitting the last sheet to slide past them for the rest of its movement. The retard roller 47 would continue to turn since it is unaffected by the insert, but more force would be available to turn it with rollers 46 and 48 lifted.

This invention has been described in detail with particular reference to preferred embodiments thereof, but it will be understood that variations and modifications can be effected within the spirit and scope of the invention.

We claim:

1. A duplex document handler for selectively moving either one side or each side of each document sheet in a multisheet document past a stationary exposure position, comprising:

supply means for receiving a multisheet document, means for feeding each document sheet of said document from said supply means along a supply path past said exposure position, means for feeding said document sheet along a simplex path from said exposure position to a simplex exit means for receiving said sheets stacked in their original order, said simplex exit means being located on the side of said exposure position opposite said supply means, means for feeding said document sheet along a duplex path, leading edge first, from said exposure position, through an inverting path, into a reversing location generally above said supply path, and then for feeding said document sheet, trailing end first, from said reversing location past said exposure position through said inverting path and said reversing location again, to a duplex exit means for receiving said sheets stacked in their original order, said duplex exit means being located on the same side of said exposure position as said supply means, and means for selecting between said duplex and simplex paths.

2. A duplex document handler according to claim 1 wherein all three means for feeding said document sheet include a turnover drum located opposite said exposure position which rotationally guides said document sheet past said exposure position, around said inverting path, into said reversing location and from said reversing location back to said exposure position.

3. A duplex document handler according to claim 2 wherein said means for feeding said document sheet along said duplex path includes means for diverting the leading edge of a document sheet from said drum and a pair of reversible drive rollers located at said reversing position and rotatable in a first direction for driving a document sheet so diverted, leading edge first, away from said drum into said reversing position, and, rotatable in a second direction, for driving said sheet trailing edge first, back to said drum.

4. A duplex document handler according to claim 3 wherein said reversible drive rollers also are a portion of the means for driving said document sheet to the duplex exit means.

5. A duplex document handler for selectively moving either one side or each side of each sheet of a multipage document past an exposure position, comprising:

supply means for receiving said multipage document as an ordered stack of sheets, face down, means for feeding said document sheets from the bottom of said stack, one at a time, past said exposure position, means for feeding said document sheets along a simplex path from said exposure position to a simplex exit tray located on the side of said exposure position opposite to said supply means, where said document sheets are stacked, face down, in their original order, means for feeding said document sheets along a duplex path, leading edge first, from said exposure position, through an inverting path, into a reversing location generally above said supply path, and then, trailing end first, from said reversing location past said exposure position, again through said inverting path and said reversing location, to a duplex exit tray located on the same side of said exposure position as said supply means, where said document sheets are stacked, face down, in their original order, and means for selecting between said duplex and simplex paths.

6. A duplex document handler according to claim 5 wherein all three means for feeding said document sheet include a common turnover drum located opposite said exposure position which rotationally guides said document sheet past said exposure position, around said inverting path, into said reversing location and from said reversing location back to said exposure position.

7. A duplex document handler according to claim 5 wherein said duplex exit tray is hinged above said supply means and is pivotable to permit access to said supply means.

8. A duplex document handler for moving each side of a document sheet past a stationary exposure position, comprising:

supply means for receiving at least one document sheet;

means for feeding said document sheet from said supply means along a supply path, past said exposure station; and means for feeding said document sheet, leading edge first, from said exposure station, through a inverting path, into a reversing location generally above said supply path, and then for feeding said document sheet, trailing end first, from said reversing location past said exposure station to present the opposite side of said document sheet to the exposure position, and then for feeding said document sheet through said inverting path and said reversing location again to a duplex exit means, located generally over said supply means.

9. A duplex document handler according to claim 8 wherein said duplex exit means is a tray hinged to permit access to said supply means.

* * * * *

UNITED STATES PATENT OFFICE
CERTIFICATE OF CORRECTION

Patent No. 4,884,097   Dated   November 28, 1989

Inventor(s) John Giannetti et al

It is certified that error appears in the above-identified patent and that said Letters Patent is hereby corrected as shown below:

On the title page:
Item No. [75] Inventors:, after "Henrietta," insert ---Robert H. Shea, Victor,---.

Signed and Sealed this

Ninth Day of June, 1992

Attest:

DOUGLAS B. COMER

Attesting Officer   Acting Commissioner of Patents and Trademarks